(No Model.)
T. C. YOUNG.
CORN PLANTER.
No. 357,509. Patented Feb. 8, 1887.
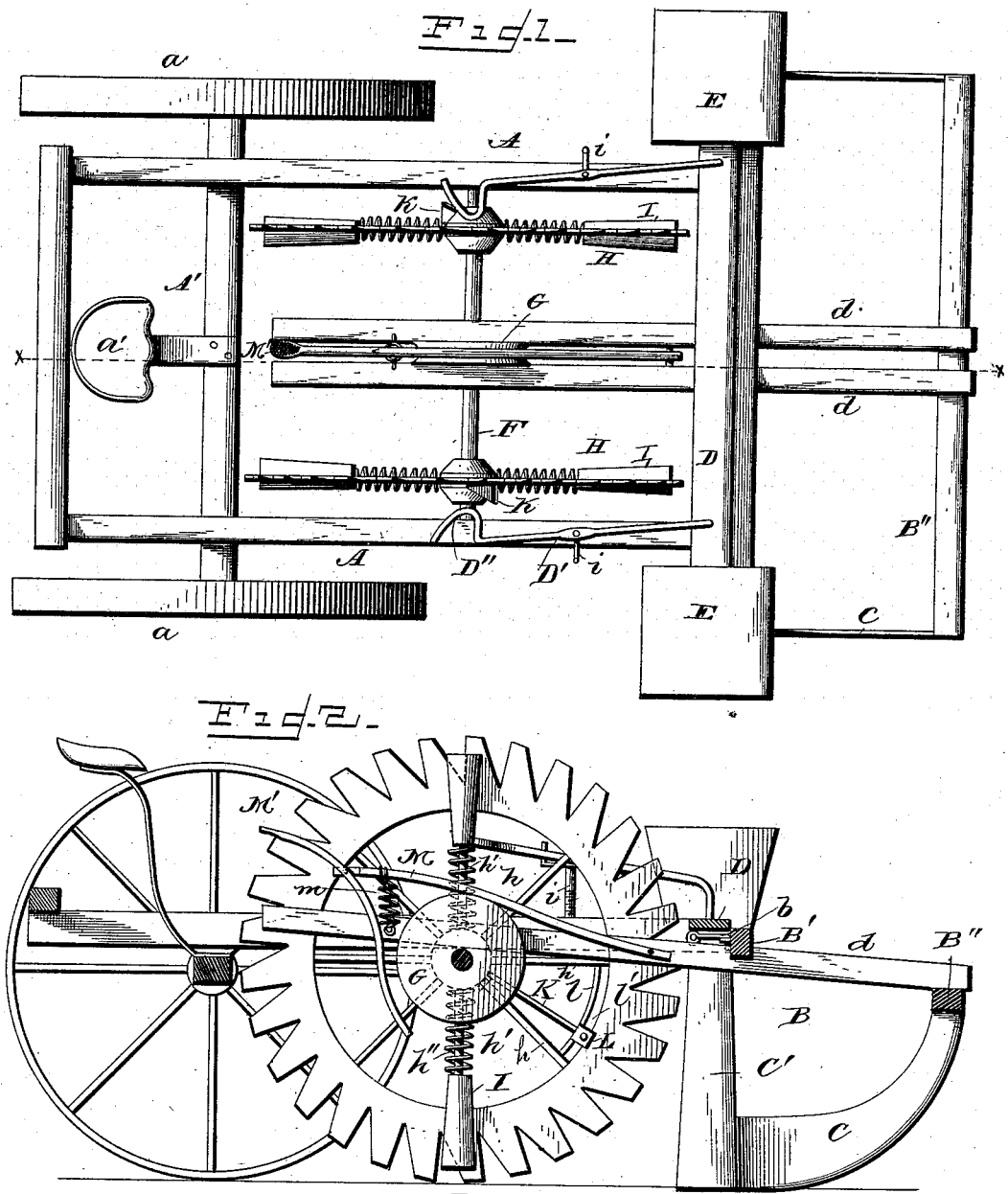
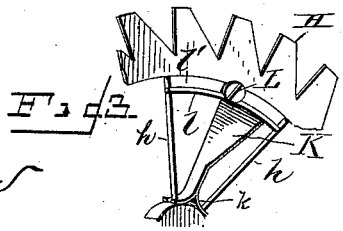
WITNESSES
Thomas C. Young.
INVENTOR
Attorney

UNITED STATES PATENT OFFICE.

THOMAS C. YOUNG, OF ST. CHARLES, IOWA.

CORN-PLANTER.

SPECIFICATION forming part of Letters Patent No. 357,509, dated February 8, 1887.

Application filed July 22, 1886. Serial No. 208,743. (No model.)

*To all whom it may concern:*

Be it known that I, THOMAS C. YOUNG, a citizen of the United States of America, residing at St. Charles, in the county of Madison and State of Iowa, have invented certain new and useful Improvements in Corn-Planters; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in corn-planters; and it consists in the construction and combination of the parts, as will be hereinafter fully set forth, and specifically pointed out in the claims.

In the accompanying drawings, which illustrate my invention, Figure 1 is a plan view showing my improvement applied to a corn-planter. Fig. 2 is a sectional view through the line $x\,x$ of Fig. 1, and Fig. 3 is a detail perspective view.

A refers to the side bars of the frame of an ordinary planter, to the rear portion of which is rigidly attached an axle, A', upon which are mounted the supporting-wheels $a\,a$, said axle also serving as a support for the driver's seat $a'$. To the front ends of these side bars, A, the frame B is hinged or pivotally attached, said longitudinal bars A being directly connected to the transverse bar B' by means of hooks or other similar connections, $b$. To the under side of the forward frame are attached shoes C, the rear portions thereof being attached to the seed-spouts C' thereof.

Immediately above said seed-spouts the seed-slide D reciprocates. The front frame, B, has attached near its center rearwardly-extending parallel bars $d\,d$, which are rigidly attached to the beams B' and B'' of the front frame.

The seed-boxes F F may be formed integral with the seed-spouts C', which are attached to the cross-bar B' of the front frame.

To the under side of the bars A A of the rear frame are attached bearings, within which is mounted an axle, F, said axle having rigidly keyed upon its central portion a grooved disk, G, said disk lying between the bars $d\,d$, which are attached to the front frame. This axle F also carries within the bars A A wheels H H, the peripheries of which are notched or serrated, as fully shown in Fig. 2. These wheels H are preferably made of metal, and are thin at their peripheries, so that they will enter the ground. These wheels H are attached to their hubs by spokes $h\,h$. On each wheel H H the spokes $h'$ thereof are encircled by spiral springs $h''$, said springs bearing upon the hub and upon blocks I, which are recessed or grooved so as to lie over each edge of the wheel H, said blocks serving as markers so as to indent or form an impression in the ground when they come in contact therewith. The spiral springs $h''$ allow an upward-yielding movement of these markers I, and thereby prevent the frame being elevated.

To the upper sides of the bars A are attached upwardly-projecting pins $i$, which are screwed therein, the upper ends being of a reduced diameter and formed with shoulders, upon which will bear the bars D', which move pivotally upon these screws $i$. The forward ends of the bars D' are attached to the seed-slide D, while their rear ends are bent inwardly, as shown at D'', so that they will contact with outwardly-projecting flanges K, which are attached to the wheels H H. These outwardly-projecting flanges K have their lower portions, $k$, bent forwardly and rearwardly and notched, so as to engage with the spokes $h$, between which they lie, and within the periphery of the wheel H is secured a bent bar, $l$, which forms with the inner edge of the wheel a curved slot, $l'$, within which lies a bolt, L, which secures the outer end of the flange K in position, so that it can be adjusted. It will be noted that the flanges K K are located diametrically opposite each other on the wheels, so that at each rotation of the axle the seed-slide will be moved twice. Should the wheels H not move in unison, so as to mark the drop of the seed properly, the lever M, which is pivotally attached between the bars D D, can be depressed by the driver, who places his foot upon the end of the pivoted bar M', so as to depress the same and the lever M, so as to hold the grooved wheel G and axle F stationary, thus holding the same from a rotary movement until said wheels are properly adjusted.

The lever M is held out of contact with the grooved disk G by a spring, m. When the bar M' is depressed, its lower end will contact with the under side of the grooved wheel G. By means of the lever M the movement of the wheels H may be stopped, as when passing around an object and when it is desired not to drop the corn.

By this device, when a machine is moved forward, each half-revolution of the wheels will drop two hills, and the parts may be adjusted so that marks will be made adjacent to where the seed is dropped.

I claim—

1. In a corn-planter constructed substantially as described, a rear frame mounted on wheels and provided with serrated disks having slotted yielding markers J, embracing the rims of the wheels, and outwardly-projecting flanges K, which abut against pivoted bars to oscillate the seed-slides, substantially as shown, and for the purpose set forth.

2. The combination, in a corn-planter, with the operating-wheels H, having serrated edges, a circumferentially-grooved disk, G, mounted upon the supporting-axle of said wheels, of a lever adapted to bear upon the groove in the disk G, to hold the axle stationary, substantially as shown, and for the purpose set forth.

3. In a corn-planter, the combination of the rear frame provided with supporting-wheels, a front frame pivoted thereto and carrying seed-boxes, seed-spouts, and shoes, an axle, F, journaled to the main frame and provided with serrated wheels H H, having adjustable projecting flanges K, and pivoted bars D', attached to each side of the frame, for operating the seed-slides, the parts being organized substantially as shown, and for the purpose set forth.

4. In a corn-planter, the combination of the axle F, having wheels or serrated disks H rigidly attached thereto, a central grooved disk, G, and the lever M, pivotally secured between the bars d d and provided with a spring, m, substantially as shown, and for the purpose set forth.

5. The combination, in a corn-planter, of the serrated disks H, having spokes h, between which are secured curved bars l, outwardly-projecting plates or flanges K, with recessed portions adapted to engage with the spokes adjacent to the hub, and bolts L, for securing the upper edges of the flanges within the curved slot l', substantially as shown, and for the purpose set forth.

6. In a corn-planter, the combination of the serrated wheels H, markers I, having slotted portions which lie over the sides of said wheels, and spiral springs h'', for depressing the same, substantially as shown, and for the purpose set forth.

In testimony whereof I affix my signature in presence of two witnesses.

THOMAS C. YOUNG.

Witnesses:
M. I. BEAN,
S. M. CREGER.